No. 687,207. Patented Nov. 26, 1901.
C. C. DOVER.
DRIVING REIN RETAINER.
(Application filed Aug. 21, 1900.)
(No Model.)

WITNESSES:
R. G. West
C. H. Ash

INVENTOR:
Charlotte C. Dover.
Per. Lucius C. West,
atty.

UNITED STATES PATENT OFFICE.

CHARLOTTE C. DOVER, OF KALAMAZOO, MICHIGAN.

DRIVING-REIN RETAINER.

SPECIFICATION forming part of Letters Patent No. 687,207, dated November 26, 1901.

Application filed August 21, 1900. Serial No. 27,568. (No model.)

*To all whom it may concern:*

Be it known that I, CHARLOTTE C. DOVER, a citizen of the United States, residing at Kalamazoo, in the county of Kalamazoo, State of Michigan, have invented a new and useful Driving-Rein Retainer, of which the following is a specification.

The object of the invention is to provide a harness with a very cheap and simple leather attachment made and attached in a manner to appear finished and inconspicuous and capable of being made by the harness-maker with no outlay except an odd strap and a little stitching, and seeming to the observer to constitute a part of the harness. The well-known object of the attachment is to prevent by its use the driving-reins from falling down at the sides of the horse and getting caught by the tail of the horse or any part of the harness or fixtures of the vehicle. The design is that from its finished and inconspicuous appearance a careless driver runs less risk of betraying its use.

Figure 1:
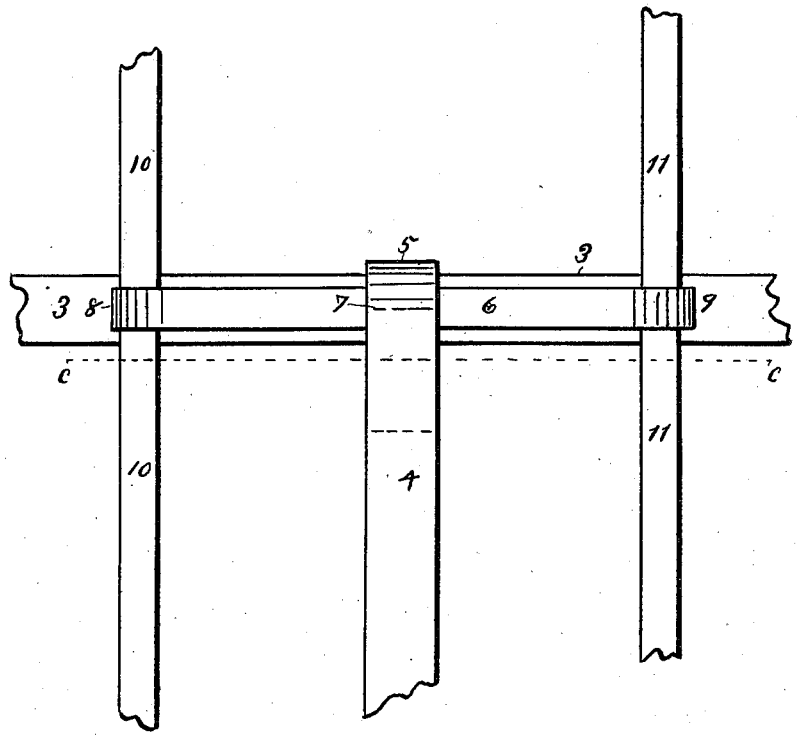
Figure 2:
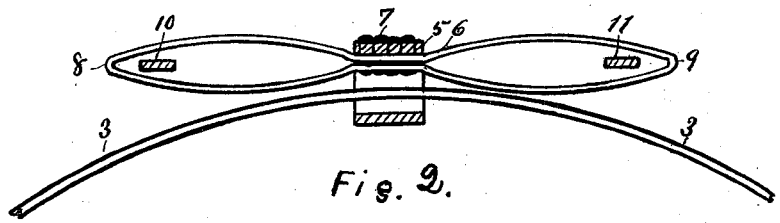

In the drawings forming a part of this specification, Figure 1 is a plan view of my retainer as attached to a harness, and Fig. 2 is a section on line *c c* in Fig. 1 looking from a point below.

Referring to the parts of the drawings pointed out by numerals, 3 represents the strap of a harness which supports the breeching and which strap lies over and upon the rump or hips of the horse, said strap being here shown broken at the ends. The crupper-strap 4 (here shown broken) has a loop 5, which loosely surrounds the breeching-supporting strap 3. Through the loop 5 of the crupper-strap 4 and above the breeching-supporting strap 3 is passed the looped rein-retainer 6, said rein-retainer being attached centrally between its two ends to the upper strap or portion of said loop 5 and to the under side of the latter. The strap of which the retainer proper is made has a loop 8 at one end and a loop 9 at the other end, through which loops the reins 10 and 11 are loosely passed. The reins are here shown broken. With such an arrangement and construction the harness presents a naturally finished and inconspicuous appearance and the expenditure in time and material is almost too slight to consider, but will greatly add to the utility of a harness and increase its selling value, and the reins are not retarded in their natural free backward, forward, and lateral movements.

It should be stated that the mode of attaching the rein-retainer 6 is by stitching, as shown by the stitches 7.

Having thus described my invention, what I claim as new, and desire to secure by Letters Patent of the United States, is—

The combination of the breeching-supporting strap 3, the crupper-strap 4 loosely looped around said breeching-supporting strap by loop 5, and the rein-retainer 6 having its two ends formed into loops 8, 9, said rein-retainer 6 being passed through the loop 5 of the crupper-strap 4 and attached to the under side of the upper portion of said loop 5 by stitches 7, substantially as set forth.

In testimony of the foregoing I have hereunto set my hand in the presence of two witnesses.

CHARLOTTE C. DOVER.

Witnesses:
LUCIUS C. WEST,
GEO. F. KIDDER.